April 9, 1957
R. BOUREK ET AL
2,788,175
FURNACE CONTROL SYSTEM
Filed May 12, 1955
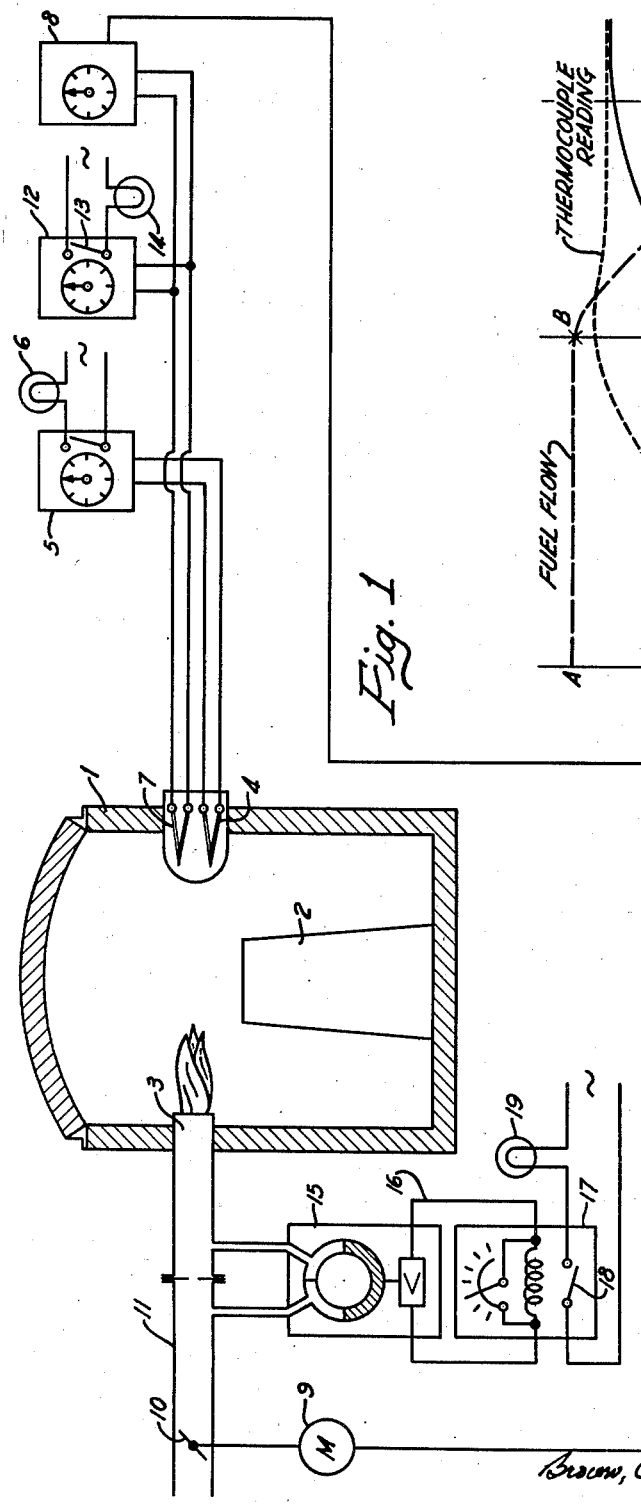
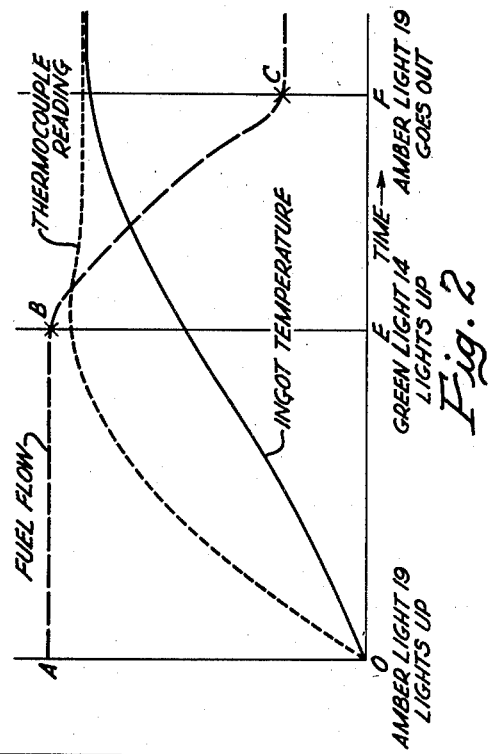
INVENTORS
PAUL L. WACHENDORFER, SR.
RUDOLF BOUREK
BY
THEIR ATTORNEYS

United States Patent Office 2,788,175
Patented Apr. 9, 1957

2,788,175

FURNACE CONTROL SYSTEM

Rudolf Bourek, Vienna, Austria, and Paul L. Wachendorfer, Sr., Joliet, Ill., assignors to James G. Murray, Jr., Pittsburgh, Pa.

Application May 12, 1955, Serial No. 507,943

8 Claims. (Cl. 236—15)

This invention relates to the regulation of temperature in industrial furnaces.

A particular object of the invention is to provide a simple and accurate system which will automatically indicate when an article in the furnace has been heated throughout to the desired temperature.

When material is being heated in an industrial furnace, such as heating an ingot in a soaking furnace, it is desirable to remove the ingot from the furnace at the exact moment when it becomes heated throughout to the desired temperature. If it is removed either before or after the desired temperature is reached, the metallurgical character of the finished article to be made from the ingot may be spoiled. Also, applying more heat than necessary results in a waste of heat and poor economy.

It is usually impossible or impractical to obtain direct temperature readings on an ingot in the furnace, and in spite of many attempts to solve this problem by automatic devices, in actual practice the time at which the article or ingot is removed from the furnace is determined largely by the judgment of the operator. This practice often results in improper timing, with the bad effects explained above.

The furnace control system of the present invention gives an automatic indication of the correct time to withdraw the ingot by combining a reading taken from one indicating device which indicates the rate of energy input to the furnace, with a second reading taken from a device which indicates the temperature within the furnace.

The system includes accurate devices for giving the indications of furnace temperature and fuel flow.

These and other objects and advantages of the invention will become apparent as the description proceeds.

In the drawings:

Fig. 1 is a schematic diagram of a system incorporating the invention;

Fig. 2 is a curve diagram illustrating the operation of the system.

Referring to the drawings more particularly, the invention will be explained in connection with the furnace 1, which is a so-called "soaking pit" in which an ingot 2 is being heated to a desired temperature preparatory to a subsequent rolling operation. The furnace is heated by a gas burner 3.

A thermocouple 4 inserted into the furnace is connected to a control 5 which is set for a maximum safe temperature. When this maximum is exceeded the control 5 may be connected so as to automatically shut off the fuel and give a visual indication, as by lighting the red light 6. This danger signal indicates that the temperature in the furnace is too high and that the entire system must be shut down. The thermocouple 4 may be called the safety thermocouple, since it operates the safety shut-off mechanism.

Another thermocouple 7 is inserted in the furnace, and this thermocouple is connected to a temperature regulator 8, which in turn is connected to a motor 9 which operates a valve 10 in the fuel line 11. The regulator 8 is of the type which may be set for a desired temperature, and which automatically controls the fuel supply to attain that temperature. The thermocouple 7 may be called the control thermocouple, since it controls the temperature.

Also connected to thermocouple 7 is a temperature-responsive device 12 which has an adjustable maximum contact, and may be set for the desired temperature. When that temperature is reached, the device 12 closes a switch 13 which actuates a visual signal, such as the device 14, which may be a green light.

The device for measuring and indicating the fuel flow is indicated diagrammatically at 15. This device is preferably a meter using the combination of a ring gauge and an electrodynamometer, as described fully in our co-pending application Serial No. 459,163. In this type of flow meter the current flowing in the circuit 16 to the electro-dynamometer is directly (rigidly) proportional to the quantity of flow in the fuel line 11.

The circuit 16 is connected to a device 17, which may be an adjustable current relay. This device 17 is set so as to close a switch 18 when the current flowing through circuit 16 exceeds a value corresponding with a flow of fuel in line 11 just enough to replace predetermined heat losses from the furnace. When switch 18 is closed current flows through an indicating device 19, which may be an amber light.

The "predetermined heat losses" include all sources of heat loss from the furnace, as by conduction through the walls, losses when the furnace is opened for replacing ingots, etc.

It will be understood that the lights 6, 14 and 19 are grouped together on a panel board, so that they may be observed simultaneously.

After an ingot 2 is placed in the furnace, the operation of the system is as illustrated in Fig. 2, in which the abscissa indicates time, and the ordinate indicates values, as shown on the several curves.

Assuming that the furnace is cold, the ingot temperature and the reading of the control thermocouple are both low, as indicated at the zero point on the diagram. At this time the regulator 8 permits the fuel valve 10 to assume a full open position, and the flow of fuel is at the maximum, as indicated at point A.

At this time since the current in circuit 16 is greater than the minimum for which the adjustable current relay 17 is set, the switch 18 is held closed, and the amber light 19 lights up. The signal of the amber light alone indicates that both the ingot 2 and the furnace 1 are heating up.

After a certain interval of time, which may be indicated by the abscissa O—E, the control thermocouple 7 reaches the desired temperature for which the instruments 8 and 12 have been set. At this point, indicated by line B—E on the diagram, control device 8 cuts down the amount of fuel flowing to the furnace. Simultaneously the device 12 closes switch 13 and lights up the green light 14.

At this point the amber light 19 and the green light 14 are both on. The presence of the green light indicates that the furnace has reached the desired temperature. The presence of the amber light indicates that the ingot is still soaking up heat, since the amount of fuel flowing to the furnace is greater than the amount needed to replace the predetermined losses from the furnace.

It will be seen from the diagram, Fig. 2, that after the time B—E the curve representing the fuel flow drops sharply, showing that the amount of fuel has been reduced.

Simultaneously the curve representing the thermocouple reading drops slightly and then levels off at the desired final temperature.

At the same time the curve representing the ingot temperature continues to rise, showing that the ingot is still "soaking up" heat. It should be understood that this curve for ingot temperature is the result of experimental work, and is included on the diagram, Fig. 2, merely to assist in understanding the operation of the invention. In operating under the invention, it is unnecessary to take direct readings of ingot temperature.

When the ingot reaches a condition in which it is heated throughout to the desired temperature for which the controls 8 and 12 were set, it no longer absorbs an appreciable amount of heat. This condition is indicated at the line C—F, where the curve representing the ingot temperature levels off at the same temperature as the curve of the thermocouple reading.

When point C is reached, the temperature control device 8 cuts down the fuel to the bare amount needed to replace the predetermined furnace losses. Since this amount of fuel flow is less than that for which the adjustable current relay 17 is set, the switch 18 is permitted to open and amber light 19 goes out.

The presence of the green light 13 alone now indicates that the ingot is completely "soaked," that is, that it is uniformly heated throughout to the desired temperature. At this point the operator will remove the ingot from the furnace.

While a preferred form of the system has been described above by way of illustration, it should be understood that any equivalent devices may be used to give the several indications referred to. If the furnace is heated by electricity, the meter device 15 will of course be replaced by a suitable instrument for measuring the current supplied to the furnace.

In place of the lamps, or in addition thereto, a recording device may be used to draw curves, one showing the rate of fuel supply and the other temperature of the furnace. Such records may be used for operating the furnace, and also as permanent records of the treatment given to each furnace charge.

The system of the invention has been explained as applied to a "soaking" furnace, but obviously it may be used in connection with heat-treat furnaces, or any other furnace where a device of this kind would be of advantage.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A system for indicating when an article in a furnace has reached a uniform desired temperature which comprises: a furnace containing an article to be heated, a temperature-responsive device located inside the furnace for sensing the temperature inside the furnace, means supplying heat energy to the furnace, regulating means connected to the temperature-responsive device and to the means supplying heat energy, the regulating means being adapted to regulate the supply of energy so as to prevent the furnace temperature from exceeding the desired temperature, a meter for measuring the flow of heat energy to the furnace, a first indicating device operated by the meter and designed to give an indication when the flow of fuel is reduced to the amount required to replace said predetermined heat losses, and a second indicating device operated by the temperature-responsive device and designed to give an indication when the temperature-responsive device reaches the desired temperature, whereby when the first indicating device shows that the flow of heat energy has been cut down to the amount required to replace said predetermined heat losses, and the second indicating device shows that the desired temperature has been reached, it is known that the article is heated uniformly throughout to the desired temperature.

2. A system as specified in claim 1 in which the temperature-responsive device is a thermocouple.

3. A system as specified in claim 1 in which the meter is a flow meter coupled with an electro-dynamometer, so that the electrical current flowing through the electro-dynamometer is rigidly proportional to the flow through the flow meter.

4. A system as specified in claim 1 in which a third indicating device shows when the temperature of the furnace has exceeded a maximum safe temperature.

5. A system for indicating when an ingot in a furnace has reached a uniform desired temperature, which comprises: a furnace containing an ingot, a thermocouple located inside the furnace for sensing the temperature inside the furnace, an actuating device connected to the thermocouple and set for a desired temperature, a gas burner supplying a combustible mixture to the furnace, a fuel valve in the gas line, there being a temperature regulator connected between the thermocouple and the fuel valve, the regulator being capable of controlling the fuel valve so as to prevent the furnace temperature from exceeding the desired maximum for which the thermocouple actuating device is set, a flow meter for measuring the flow of fuel in the gas line, a first indicating device operated by the flow meter and designed to give one indication when the flow of fuel exceeds the amount required to replace predetermined heat losses, and to give a second indication when the flow of fuel is reduced to the amount required to replace said predetermined heat losses, and a second indicating device operated by the thermocouple actuating device which gives an indication when the thermocouple reaches the maximum desired temperature for which the thermocouple control has been set, whereby, when the first indicating device shows that the flow of fuel has been cut down to the amount required to replace said predetermined heat losses, and the second indicating device shows that the desired temperature has been reached, it is known that the article is heated uniformly throughout to the desired temperature.

6. A system as specified in claim 5 in which the flow meter is coupled with an electro-dynamometer, so that the electrical current flowing through the dynamometer is rigidly proportional to the flow through the flow meter.

7. A system as specified in claim 5 in which the indicating devices are lamps.

8. A system as specified in claim 5 in which a third indicating device shows when the temperature of the furnace has exceeded a maximum safe temperature.

References Cited in the file of this patent

UNITED STATES PATENTS

| 2,285,288 | Krogh | June 2, 1942 |
| 2,656,172 | McGough | Oct. 20, 1953 |

OTHER REFERENCES

"Instrumentation," October and November issue 1945, published by Brown Instrument Company, Wayne and Roberts Avenue, Philadelphia, Pennsylvania, pages 15, 16 and 17.